Nov. 15, 1949     R. L. PEEK, JR     2,488,325
ELECTRICAL WINDING
Filed June 25, 1947
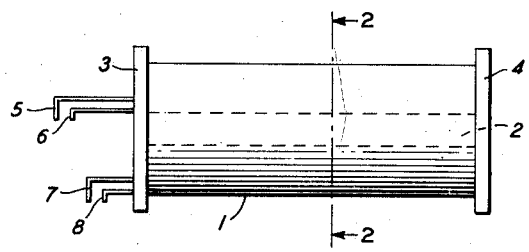
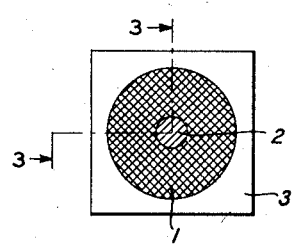
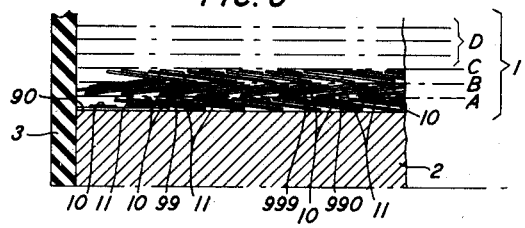
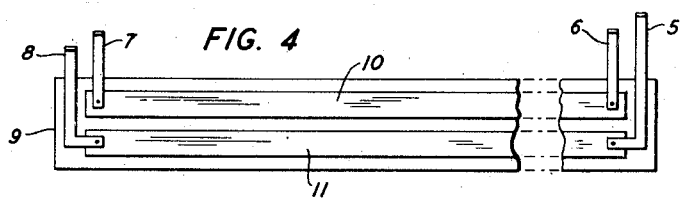
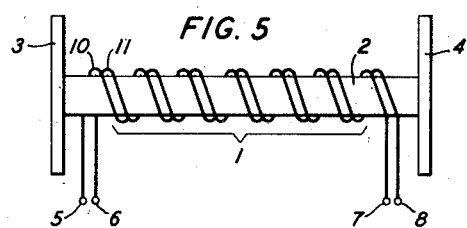
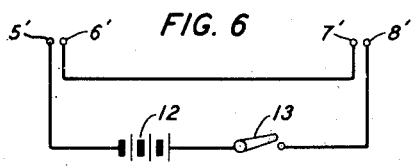
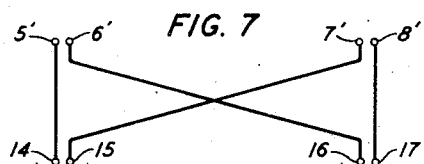
INVENTOR
R. L. PEEK, JR.
BY
J. W. Schmied
ATTORNEY Patented Nov. 15, 1949

2,488,325

UNITED STATES PATENT OFFICE 2,488,325

ELECTRICAL WINDING

Robert L. Peek, Jr., New York, N. Y., assignor to Bell Telephone Laboratories, Incorporated, New York, N. Y., a corporation of New York Application June 25, 1947, Serial No. 756,874

3 Claims. (Cl. 175—21)

This invention relates generally to electrical windings and more particularly to an improved winding structure whereby contacts serially connected with said winding are protected from deleterious effects of inductive surges and whereby windings of balanced impedance are obtained.

It has been well known for some time that an inductive winding, such as a relay winding, when shunted by a condenser or other capacity, will be impeded somewhat from creating excessive sparking at contacts controlling said winding, the sparking being due primarily to inductive current surges created by opening or closing of the winding circuit by said contacts. It is also common knowledge among those skilled in the art that an electrical winding may be constructed of two separate halves, or thirds, etc., which, when simultaneously wound adjacent one another and subsequently connected in series aiding fashion, for instance, will exhibit marked distributed capacity between parts of the winding. This capacity may be used as some protection against the type of sparking previously mentioned. A typical coil or winding structure embodying the principle of the latter type of winding, may, as disclosed in the prior art, comprise a double conductor, having two semicircular parallel sections of conductor with respective flat sides facing each other, wound in the form of a spool of wire which could very well serve as a relay or other electrical winding. Furthermore, it is not new, generally speaking, to construct an electrical winding of flat conductors, single or plural.

According to the present invention a plurality of parallel flat conductors are simultaneously wound such that each succeeding turn of any one of said conductors lies substantially concentric with a preceding turn of another of said conductors. The various conductors may be connected in series aiding fashion whereupon the distributed capacity will be useful to diminish sparking at contacts controlling the winding. The said parallel conductors may be used as separate windings where balanced windings are desired, the said individual windings, having been simultaneously wound, exhibiting substantially equal impedances and therefore especially suited to circuits requiring pairs or trios, etc., of such balanced windings. By using flat conductors and winding them simultaneously such that each succeeding turn of one conductor lies substantially concentric with a preceding turn of another conductor a marked increase in capacity between windings is realized over prior winding structures, as will be appreciated when such structure is compared to well-known paper condensers embodying similar construction.

The above brief general description of the present invention is set forth in detail in the following description of one embodiment of the invention, which description refers to the drawing forming a part thereof and for which drawing the following are general descriptions of the various figures comprising same:

Fig. 1 is a side elevation view of an electrical winding constructed according to the invention;

Fig. 2 is a view taken in the direction 2—2 of Fig. 1;

Fig. 3 is an enlarged view taken in the direction 3—3 of Fig. 2;

Fig. 4 is an illustration of parts of the length of a double flat conductor which may be used in constructing the winding of Figs. 1, 2 and 3, as will be described;

Fig. 5 is a schematic representation of the completed winding of Fig. 1; and

Figs. 6 and 7 represent at least two manners of connecting the two separate parts of the winding of Fig. 5, as will be described subsequently.

Referring to Figs. 1, 2 and 3 of the drawing, a composite coil 1 is assembled on a spool 2 (which may or may not represent an iron core) between spool heads 3 and 4, and four terminals 5, 6, 7 and 8 are internally connected to the ends of two separate winding portions of the composite coil 1 as will be explained.

Fig. 4 illustrates a strip of insulation 9, which may be of such material as paper or a plastic composition such as cellulose acetate or the like well known materials, said strip 9 having associated therewith two separate flat lanes 10 and 11 of conducting material. This strip 9 with its lanes 10 and 11 of conducting material comprises a means of winding two parallel conductors simultaneously as shown by the enlarged section in Fig. 3. The first turn 90 of strip 9 lies flatly against the spool 2, or core 2 for a relay; the next turn 99 of said strip 9 is advanced one lane along core 2 such that the line 10 on turn 99 lies substantially concentric with the lane 11 of the preceding turn 90 of strip 9, and so forth, along core 2 to spool head 4 of Fig. 1. The strip 9 is then wound along core 2 in the opposite direction over the first layer of strips. The enlarged view of Fig. 3 somewhat exaggerates the winding structure for purposes of clarity of disclosure and the imaginary horizontal lines A, B, C and D, are indicative of the fact that the respective layers of turns will represent substantially smooth layers upon which a succeeding layer may be wound. The second layer of Fig. 3, located between the imaginary lines A and B, shows a turn 990 of strip 9 having its lane 11 substantially concentric with lane 10 of the turn immediately preceding turn 989 to the right of the latter in Fig. 3. Likewise turn 999 is advanced one lane from turn 990 such that lane 11 of turn 999 lies substantially concentric with lane 10 of turn 990. This type of structure is continued until the full winding is so arranged on spool or core 2 as shown in Fig. 1 to comprise a complete composite coil 1. Terminals 5, 6, 7 and 8 may be soldered or otherwise connected to the respective ends of respective lanes 10 and 11 of strip 9 as shown in Fig. 4 and these terminals may be brought out for subsequent circuit interconnection as will be explained.

Since each succeeding turn of one winding, or lane 10, is substantially concentric with the preceding turn of the other winding or lane 11, or vice versa, it will be readily appreciated that a structure, as between lanes or windings 10 and 11, results which is in effect a relatively large capacity condenser. The distributed capacity between such windings is considerably greater than between round or semicircular conductor windings comparably arranged and the insulation properties are improved as related to comparable lane-to-lane, or conductor-to-conductor voltages per turn.

By the use of such a composite coil structure as proposed herein it is possible to acquire sufficient capacity between parallel portions thereof to obviate the use of any actual shunt capacitor and to improve the available distributed capacity of parallel windings of the type disclosed in the prior art.

Among the many considerations necessary of study in the design of an electrical winding, such as proposed herein, are such factors as insuring a sufficient number of turns to effect the desired inductance, provision of small separation between different turns of different windings having large areas of conductor to create the most favorable condenser geometry for the composite winding structure, maintenance of adequate voltage insulation between conductors of different windings per turn of said windings and between adjacent turns of said parallel windings and, of course, retention of a desirable space factor, all of the above consistent with the lowest practical cost.

The use of parallel lanes of conducting material on a common strip insulator is a favorable means of constructing a composite electrical winding which will satisfy the above design consideration, not to mention other considerations appreciable by those skilled in such art in view of the disclosure set forth herein. Adequate voltage insulation between parallel conductors, such as 10 and 11 of Fig. 4, of each turn may be realized by properly spacing said conductors on the strip insulator, such as 9 of Fig. 4. The strip 9 may be of suitable thickness and possess suitable insulating properties as to afford the necessary turn to turn insulation. The desirable condenser geometry, previously explained, is, of course, the result of utilizing flat conductors of large area separated from each other by a small distance, such as the thickness of strip 9. The matters of a sufficient number of turns for the required inductance and a practical space factor are concerned primarily with the dimensions of the strip 9 and of the conductors 10 and 11, a small conductor cross-section being desirable for each of the latter design considerations.

Such parallel conductor arrangements as shown in Fig. 4, comprising a strip or sheet 9 of insulating material such as paper or a plastic, such as cellulose acetate or the like, may be useful in at least two forms. The strip 9 of insulation may be a member separate from the conductors 10 and 11 and may be wound simultaneously with two physically distinct and separate thin conductors made of rolled copper, aluminum or similar conducting material. Another type of parallel conductor arrangement suitable for the purpose of this invention is that wherein the conductors, such as 10 and 11 of Fig. 4 are bonded to the associated strip insulator, such as 9 of Fig. 4. Generally speaking, such bonded structures fall within two classes; namely, conductors bonded to insulator strips by an adhesive and those bonded by the processes known generally as metallizing, either of which is conducive to subsequent coil impregnation, if desired. For some applications, the latter type of winding structure is preferred because of its superior mechanical strength; however, either is fully suited to the practice of the invention.

The production of such parallel winding means as shown in Fig. 4, above, wherein the conductor material is bonded in some manner to the insulation strip, falls within the skill of the art relating to metallizing non-conductors or to the applying or securing to non-conductors of conducting material suitable for electrical windings. A booklet published by Metal Industry Publishing Company entitled "Metallizing Non-Conductors," by Samuel Wein, and copyrighted in the year 1945 by the above publishing company, discusses such processes as may be used to produce a strip of insulation carrying a plurality of conducting lanes thereon according to Fig. 4. Some of the means mentioned by the referenced publication for metallizing non-conductors are mechanical films, chemical reduction films, metal spraying, plating and electrodeposition. Another means well known in the art is the so-called evaporation process. It is not considered necessary to describe these various means and methods of obtaining conductive coatings on insulating material as such methods and processes are common knowledge and experimentation will indicate a desired method or process for a particular purpose.

It may be desirable, depending on the conditions of use of the coil, and particularly when paper is used as the insulating material, to impregnate a coil made in accordance with the invention to further secure the positioning of the various parts of the winding structure, to improve the voltage insulation properties thereof, to obtain a measure of moisture-proofing and to increase the capacity effect by introduction of a dielectric constant greater than would exist with air spacing. Such impregnation of electrical windings is common knowledge and is not requisite of other than mention to those skilled in the pertinent art.

Fig. 5 shows a schematic representation of a parallel wound composite coil 1 with terminals 5, 6, 7 and 8 brought out for circuit interconnection. The coil 1 is composed of two separate portions made up of the simultaneously wound lanes 10 and 11 as previously described. Figs. 6 and 7 illustrate at least two methods of interconnecting the parallel windings 10 and 11 of composite coil 1 in Fig. 5. Fig. 6 illustrates a series aiding interconnection of windings 10 and 11 whereby, by means of a switch 13 and a battery 12, the composite coil or winding 1 may be used as a relay winding, the previously described structural arrangement of the individual winding portions affording to the contacts of switch 13 the previously mentioned improved means for contact spark protection. Fig. 7 illustrates the manner in which individual windings 10 and 11 may be separately connected to separate circuits. Winding 10 will appear at terminals 14 and 15 of Fig. 7 and winding 11 will appear at terminals 16 and 17. These two windings, being substantially balanced as to impedance due to the manner of constructing the coil assembly 1 of Fig. 5, may be used as a pair wherever such balanced windings may be required, such as in telephone repeaters.

The scope of the present invention contemplates such strips 9 of Fig. 4 which may be associated with three or four or more independent parallel lanes and the method of winding such strips to produce a composite coil in accordance with the invention is readily ascertainable from the above description of the double-lane strip. Such plural winding coils would, of course, effect a comparable increase of terminals over those shown in Fig. 5, but their interconnection would be equally as flexible.

Furthermore, when more than two parallel windings are utilized in accordance with this invention, it is not necessarily true that each succeeding turn of one of said windings must be located concentrically with the preceding turn of the same one always of the others of said windings. For instance, in a composite coil having four parallel winding portions numbered 100, 200, 300 and 400 and arranged side by side in that order on such a strip as strip 9 of Fig. 4, the second turn of said windings might be arranged such that lane 100 of turn 2 would be concentric with lane 200 of turn 1, lane 200 of turn 2 concentric with lane 300 of turn 1 and lane 300 of turn 2 concentric with lane 400 of lane 1 with the next succeeding turn of the strip arranged such that lane 100 thereof would be concentric, not with lane 200 of the second turn, but with lane 300 thereof and lane 200 of said succeeding turn concentric with lane 400 of turn 2, etc. The purpose of the invention in realizing a capacitive structure would still be evident but perhaps would represent less distributed capacity. The latter and numerous other variations of the structure suggested by this disclosure are intended to be included within the scope of the present invention. It will be appreciated, as well, that if more than two parallel windings are provided in accordance with the invention numerous interconnecting arrangements may be devised along the same lines of thought as expressed herein in connection with the disclosed double winding arrangements of Figs. 6 and 7 of the drawing.

The present invention is not intended to be limited in scope to the particular disclosures of structure or its use employed herein as exemplary. Therefore claims are appended which alone define the scope of the invention.

What is claimed is:

1. An electrical winding comprising a plurality of separate flat conductors uniformly spaced apart and supported upon one surface of an insulating strip, said conductors and strip forming a winding element of continuous helical form of uniform pitch throughout each layer of the winding, said pitch being equal to the laterally spaced apart distance between the axes of two of said conductors whereby each turn of one conductor on said element directly overlies a turn of another conductor on the same winding element.

2. An electrical winding comprising a plurality of separate flat metallic conductors uniformly spaced apart and supported upon one surface of an insulating strip, said conductors and strip forming a winding element of continuous helical form of uniform pitch throughout each layer of the winding, said pitch being equal to the laterally spaced apart distance between the axes of two adjacent conductors whereby each turn of one conductor on said element directly overlies a turn of an adjacent conductor on the same winding element.

3. An electrical winding comprising two separate flat metallic conductors uniformly spaced apart and bonded to one surface of an insulating strip, said conductors and strip forming a winding element of continuous helical form of uniform pitch throughout each layer of the winding, said pitch being equal to the laterally spaced apart distance between the axes of said conductors whereby each turn of one conductor on said element directly overlies a turn of the other conductor on the same winding element.

ROBERT L. PEEK, JR.

REFERENCES CITED

The following references are of record in the file of this patent:

UNITED STATES PATENTS

| Number | Name | Date |
| --- | --- | --- |
| 634,198 | Buckingham | Oct. 3, 1899 |
| 753,461 | Anderson | Mar. 1, 1904 |
| 901,299 | Kitsee | Oct. 13, 1908 |
| 1,306,815 | Houchin | June 17, 1919 |
| 1,501,787 | Lacy | July 15, 1924 |
| 2,287,170 | Ganz | June 23, 1942 |